United States Patent [19]

Miles

[11] 3,926,655
[45] Dec. 16, 1975

[54] CLEAR PERFUMED POLYAMIDE RESIN AND METHOD OF MAKING IT

[75] Inventor: Jeffrey M. Miles, Middletown, N.Y.

[73] Assignee: Hercules Incorporated, Wilmington, Del.

[22] Filed: Sept. 23, 1974

[21] Appl. No.: 508,120

Related U.S. Application Data

[63] Continuation-in-part of Ser. No. 328,425, Jan. 31, 1973, abandoned.

[52] U.S. Cl. ............... 106/243; 106/270; 252/522; 260/78 R
[51] Int. Cl.$^2$ .................... C11B 9/00; C08L 91/06
[58] Field of Search ......... 260/404.5, 362; 106/243, 106/272; 424/64; 264/344, 348; 252/522

[56] References Cited
UNITED STATES PATENTS

| | | | |
|---|---|---|---|
| 3,148,125 | 9/1964 | Strianse | 424/64 |
| 3,725,311 | 4/1973 | Grubb | 252/522 |

FOREIGN PATENTS OR APPLICATIONS

| | | |
|---|---|---|
| 1,176,992 | 5/1957 | France |

*Primary Examiner*—Theodore Morris
*Attorney, Agent, or Firm*—William S. Alexander

[57] ABSTRACT

Bodies of clear substantially cosolvent free polyamide resin containing perfume oil in the range of small but effective amounts up to the maximum proportion that yields a clear resin, usually up to about 30% by weight. The bodies may be in the form of jewelry, decorative castings, coatings on substrates and the like.

The method comprises heating a soluble resin, preferably an optically clear resin composed of cosoluble components having a relatively narrow and low molecular weight range, e.g., about 6,000 to 9,000, until it is pourable and stirrable, e.g., to about 120°C., blending up to 30% of a perfume oil, e.g., about 12% by weight, into the melt until a uniform mixture is obtained, and cooling the mixture to solidify it, preferably rapidly as by quenching in cold water. The product so obtained is then formed into useful objects, e.g., jewelry, by heat and pressure, decorative castings, coatings on substrates such as Christmas tree ornaments and electric light bulbs. Alternatively the perfume is blended into the resin in the feed line of a molding machine in which the perfumed resin bodies are fashioned directly.

4 Claims, No Drawings

3,926,655

CLEAR PERFUMED POLYAMIDE RESIN AND METHOD OF MAKING IT

RELATED APPLICATION

This application is a continuation-in-part of my application Ser. No. 328,425, filed Jan. 31, 1973 and now abandoned.

INTRODUCTION

The present invention relates to bodies of clear, substantially cosolvent free polyamide resins containing perfume oils and to methods of making the same.

BACKGROUND OF THE INVENTION

Polyamide resins are known which vary from clear to opaque and from smearable semisolids to very hard bodies of high tensile, compressive and impact strength.

It has been proposed to make perfumed objects of soft gels containing polyamide resin, e.g., a clear lipstick that can be smeared on the lips and a clear candle that, on burning, volatilizes the perfume and adds fragrance to the atmosphere around it. In these products the polyamide is used in relatively small proportions as a gelling agent in a system which otherwise contains a large proportion of solvent liquid, a dye or pigment, and a relatively small amount of fragrance. The gels are soft, spreadable and deformable at room temperature.

DESCRIPTION OF THE INVENTION

It has now been discovered that a clear, relatively rigid polyamide resin body containing perfume oil can be made without substantial amounts of added cosolvent by proper selection of the polyamide resin and by following certain preparative procedures as set forth hereinbelow.

The resin used in the invention must be optically clear at room temperature to yield an optically clear body containing perfume oil. In general the polyamide resins having this desired clarity and suitable physical properties are fatty polyamides based on condensation of polyamines, especially diamines and triamines, with relatively high molecular weight dibasic acids, especially of the type which result from dimerization of diunsaturated carboxylic acids, e.g., the condensation products of dimerized linoleic acid and ethylene diamine which have molecular weights within the range of about 6,000 to 9,000. They are characterized by substantial retention of their room temperature hardness on heating until very near the melting or softening temperature which is relatively sharp, e.g., over a range of 10°–15°C. within the range of about 100° to 200°C., depending on the molecular weight, and by a sharp decrease in viscosity at temperatures above the melting or softening point or range. The optical clarity is believed to be due to the cosolubility of all of the components in the resin. Methods of making such resins are disclosed in the expired U.S. Pat. No. 2,379,413. In contrast, some well known polyamide resins of the nylon type, e.g., nylon 6, which are not suitable for the present invention have higher molecular weights and are opaque, probably because the components of the mixture are not cosoluble.

A clear resin suitable for use in the invention is made by reacting dimerized linoleic acid with ethylene diamine to produce a product of the formula HO(—OC—R—CONHR$^1$—NH)$_n$H in which R is a hydrocarbon group of an indeterminate configuration containing 34 carbon atoms and R$^1$ is —CH$_2$CH$_2$— and which has the following typical properties:

| | |
|---|---|
| Softening point (Ball and Ring) | 110–115°C. |
| Viscosity (Brookfield) Poises at 150°C. | 30–35 |
| Poises at 160°C. | 21–27 |
| Tensile strength (p.s.i.) | 1500–2000 |
| Color Gardner, 40% solution | 4–7 |
| Specific gravity | 0.97 |

It is clear amber in color, non-tacky at room temperature, has a relatively sharp melting point and is thermoplastic with a narrow heat seal range. It exhibits good adhesion to a variety of substrates and can be applied to substrates from solution or from a melt. Thin films show good flexibility. The resins is conveniently prepared for commercial use in diced form for supplying either batch heating vessels or molding machines. Such a resin in diced form is available commercially from General Mills, Inc., under the name Versamid 930. Versamid 940 is similar thereto but has slightly lower viscosity, tensile strength and elongation. Versamid 1635 also is similar thereto but has a lighter color and lower inherent odor. Resins having these properties are excellently suitable for the present invention. Further description of the suitable resins is unnecessary because they are well known to those skilled in the art and have been extensively described in literature published by General Mills on Versamid polyamide resins, in text books, encyclopedias, and other technical publications.

The fragrances suitable for the present invention, sometimes called perfume oils, are complex mixtures of volatile compounds including esters, ethers, aldehydes, alcohols, unsaturated hydrocarbons, e.g., terpenes, and the like which are well known to persons skilled in the fragrance art and need not be further identified. Their use as to type and proportion in the present invention is limited only by solubility in the resin to produce a clear product.

The process of making the clear perfumed resin bodies of the invention comprises melting the resin by heating it until sufficiently molten to be stirrable and pourable. For a resin having the properties specified above this condition obtains when the temperature is within the range of about 100°–200°C., and preferably between about 100° and 160°C. The perfume oil is added to the liquid resin and blended therewith by stirring or other mechanical agitation until a uniform mixture or blend is formed. No cosolvent for the resin and the perfume oil need be added at any time during the process. The mixture is cooled promptly after thorough mixing to solid condition, preferably rapidly as by quenching in cold water or by pouring onto or bringing into contact with a cold metal surface to which it is not adherent. The product obtained by this process is optically clear, has a highly polished surface and a strong fragrance that faithfully represents the odor of the perfume oil, especially when the resin used has low inherent odor. These products have good optical stability and retain a substantial proportion of the fragrance for months.

The perfumed bodies of the present invention may be formed into a wide variety of useful objects such as jewelry, e.g., pendant earrings, pins, brooches, and the like; decorative castings such as birds, animals, abstract objects, and the like; coatings on various substrates, e.g., on Christmas tree ornaments and electric light bulbs such as Christmas tree lights where the heat of the lighted filament increases the volatility and rate of transfer to the atmosphere of the perfume oil from the resin coating. Such coated Christmas tree ornaments and lights can be scented with pine oil, for example, to add an aspect of reality when used on artificial Christmas trees.

The proportion of perfume oil to resin may vary from small but effective amounts of the order of about 1% up to the maximum amount the resin can contain and still maintain optical clarity which is usually of the order of about 30%. In general it is preferred to use about 10 to 15% which is an optimum value balancing the proportion of perfume oil recovered in the product against the length of the time period over which the objects give off a fragrant odor.

The following specific example illustrates the method and product of the invention.

EXAMPLE

In a vessel associated with a source of heat a quantity of diced Versamid 930 amounting to 88 parts by weight is heated to about 130°C. at which temperature the resin is a pourable and stirrable body of liquid. A quantity of a perfume oil having a floral bouquet with a woody background amounting to 12 parts by weight is stirred into the liquid resin until a uniform blend is achieved at which time the mixture is poured into standing cold water to facilitate rapid cooling and solidification and minimize loss of perfume oil. The product is clear amber solid having a highly polished surface with a pronounced odor faithfully reproducing the fragrance of the perfume oil used in making it. The product is in the form of a solid solution which lends itself to molding under heat and pressure into objects of jewelry such as pendant earrings, to casting in molds to form decorative art objects, and to spreading as a film on substrates such as Christmas tree ornaments, glass light bulbs, and the like.

Similar results are achieved using Versamid 1635 and other perfume oil fragrances.

In general it is advantageous to carry out the mixing operation in a closed vessel, preferably a pressure vessel, in order to prevent substantial loss of perfume oil by vaporization. When the final objects are made by molding, e.g., injection molding, the perfume oil is preferably introduced directly into the resin in the feed supply line, preferably after the resin is liquefied, and uniformly blended into the resin therein.

Having thus described and illustrated the invention, what is claimed is:

1. A clear thermoplastic resin body consisting essentially of a thermoplastic polyamide resin containing about 1 to 30% perfume oil and being substantially free of cosolvent, said thermoplastic polyamide being a fatty polyamide which softens in a range of 10 to 15°C. on being heated within the range of about 100°–200°C. and has a sharp decrease in viscosity at temperatures above its softening range and which has a molecular weight within the range between about 6000 and 9000.

2. A clear polyamide resin body as set forth in claim 1 in which the resin body is a solid solution.

3. A clear polyamide resin body as set forth in claim 1 in which the resin body is part of a piece of jewelry.

4. A clear polyamide resin body as set forth in claim 1 in which the resin body is in the form of a decorative casting.

* * * * *

UNITED STATES PATENT AND TRADEMARK OFFICE
CERTIFICATE OF CORRECTION

PATENT NO. : 3,926,655

DATED : December 16, 1975

INVENTOR(S) : Jeffrey M. Miles

It is certified that error appears in the above—identified patent and that said Letters Patent are hereby corrected as shown below:

Column 2, line 8 - the parenthesis "(" is omitted,
  should read --Color (Gardner, 40% solution)    4-7--

On face sheet under Assignee, "Hercules Incorporated,
  Wilmington, Del." should read --Polak's Frutal Works, Inc.,
  Middletown, N. Y.--

Signed and Sealed this sixteenth Day of March 1976

[SEAL]

Attest:

RUTH C. MASON
Attesting Officer

C. MARSHALL DANN
Commissioner of Patents and Trademarks